United States Patent
Katano

(10) Patent No.: US 8,607,906 B2
(45) Date of Patent: Dec. 17, 2013

(54) VEHICLE-INSTALLATION STRUCTURE FOR FUEL CELL

(75) Inventor: Koji Katano, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 443 days.

(21) Appl. No.: 12/996,911

(22) PCT Filed: May 19, 2009

(86) PCT No.: PCT/JP2009/059160
§ 371 (c)(1),
(2), (4) Date: Dec. 8, 2010

(87) PCT Pub. No.: WO2009/150923
PCT Pub. Date: Dec. 17, 2009

(65) Prior Publication Data
US 2011/0079455 A1   Apr. 7, 2011

(30) Foreign Application Priority Data
Jun. 10, 2008   (JP) .................... 2008-152068

(51) Int. Cl.
*H01M 8/24* (2006.01)
*H01M 2/40* (2006.01)
*H01M 8/22* (2006.01)

(52) U.S. Cl.
USPC ........ 180/65.31; 429/452; 429/454; 429/458; 429/505

(58) Field of Classification Search
USPC .............. 180/65.31, 68.5; 429/452, 454, 455, 429/456, 458, 462, 505, 26, 39
See application file for complete search history.

(56) References Cited

U.S. PATENT DOCUMENTS

| | | | | |
|---|---|---|---|---|
| 3,320,092 A | * | 5/1967 | Uline ............................ | 429/456 |
| 4,074,020 A | * | 2/1978 | Regnaut ........................ | 429/509 |
| 5,212,022 A | * | 5/1993 | Takahashi et al. ............. | 429/423 |
| 5,534,362 A | * | 7/1996 | Okamoto et al. .............. | 429/439 |
| 6,455,179 B1 | * | 9/2002 | Sugita et al. ................... | 429/471 |

(Continued)

FOREIGN PATENT DOCUMENTS

| | | |
|---|---|---|
| JP | 2001-143742 A | 5/2001 |
| JP | 2002-367637 A | 12/2002 |

(Continued)

OTHER PUBLICATIONS

Extended European Search Report issued Dec. 15, 2011.

*Primary Examiner* — John R Olszewski
(74) *Attorney, Agent, or Firm* — Kenyon & Kenyon LLP

(57) ABSTRACT

Provided is a vehicle-installation structure for a fuel cell with the capability of reducing a pressure drop in a gas flow path in the fuel cell. A vehicle-installation structure for a fuel cell in which: a fuel cell stack with an end of cells in a stacking direction being supported by an end plate is installed in a vehicle so that the stacking direction of the cells extends along a right-left direction of the vehicle; and an off gas of an oxidant gas from the fuel cell stack is exhausted via a diluter from a rear side with respect to the fuel cell stack in a front-rear direction of the vehicle, wherein a junction between a plurality of exhaust manifolds for guiding the off gas of the oxidant gas discharged from the fuel cell stack is arranged on a front side in the end plate in the front-rear direction of the vehicle.

11 Claims, 4 Drawing Sheets

(56) References Cited

U.S. PATENT DOCUMENTS

| | | | |
|---|---|---|---|
| 7,703,564 B2* | 4/2010 | Kondo | 180/65.31 |
| 7,964,318 B2* | 6/2011 | Suzuki et al. | 429/459 |
| 2002/0187382 A1* | 12/2002 | Nishiumi et al. | 429/34 |
| 2003/0148168 A1* | 8/2003 | Enjoji et al. | 429/38 |
| 2004/0023102 A1* | 2/2004 | Sugita et al. | 429/38 |
| 2004/0067408 A1* | 4/2004 | Horiuchi et al. | 429/40 |
| 2004/0086768 A1* | 5/2004 | Fleckner et al. | 429/38 |
| 2004/0106026 A1* | 6/2004 | Fujita et al. | 429/24 |
| 2004/0253499 A1* | 12/2004 | Sato et al. | 429/32 |
| 2005/0260482 A1* | 11/2005 | Frank et al. | 429/38 |
| 2006/0166058 A1* | 7/2006 | Kudo | 429/22 |
| 2006/0275641 A1* | 12/2006 | Passalacqua | 429/38 |
| 2007/0000702 A1* | 1/2007 | Yoshida et al. | 180/65.3 |
| 2007/0026275 A1* | 2/2007 | Sasaki et al. | 429/22 |
| 2007/0065696 A1* | 3/2007 | Fukuma et al. | 429/26 |
| 2007/0122669 A1* | 5/2007 | Kusano et al. | 429/26 |
| 2007/0215397 A1* | 9/2007 | Suzuki | 180/65.3 |
| 2008/0090110 A1* | 4/2008 | Kizaki | 429/13 |
| 2008/0118787 A1* | 5/2008 | Wexel et al. | 429/13 |
| 2008/0187791 A1* | 8/2008 | Matsumoto et al. | 429/13 |
| 2009/0226769 A1* | 9/2009 | Ota | 429/13 |

FOREIGN PATENT DOCUMENTS

| | | |
|---|---|---|
| JP | 2002-373687 A | 12/2002 |
| JP | 2006-221915 A | 8/2006 |
| JP | 2007-083860 A | 4/2007 |
| JP | 2008-130282 A | 6/2008 |
| WO | 2005/034272 A1 | 4/2005 |
| WO | 2008/066144 A1 | 6/2008 |
| WO | 2008/087542 A1 | 7/2008 |

* cited by examiner

VEHICLE-INSTALLATION STRUCTURE FOR FUEL CELL

This is a 371 national phase application of PCT/JP2009/059160 filed 19 May 2009, which claims priority to Japanese Patent Application No. 2008-152068 filed 10 Jun. 2008, the contents of which are incorporated herein by reference.

FIELD OF THE INVENTION

The present invention relates to a vehicle-installation structure for a fuel cell system.

BACKGROUND OF THE INVENTION

A vehicle equipped with a fuel cell has been proposed and developed for practical use, the vehicle traveling by driving a traction motor with electric power from the fuel cell which generates electric power with the supply of reactant gases (a fuel gas and an oxidant gas). In such a vehicle, the fuel cell is configured in such a way that a fuel cell stack has a plurality of stacked cells and an end in the stacking direction of the fuel cell stack is supported by an end plate. Components of a fuel gas supply system, being auxiliary apparatuses of the fuel cell, are attached to the end plate (for example, see Patent Document 1).

RELATED ART REFERENCE

Patent Document

Patent Document 1: Japanese laid-open patent publication No. 2006-221915

SUMMARY OF THE INVENTION

Problem to be Solved by the Invention

The related-art vehicles that were equipped with fuel cells had room for improvements, particularly in terms of a reduction in pressure drop in a gas flow path in a fuel cell.

The present invention has been made in light of such circumstances, and it is an object of the present invention to provide an installation structure of a fuel cell which is capable of reducing a pressure drop in a gas flow path in the fuel cell.

In order to achieve the object above, provided according to the present invention is an vehicle-installation structure for a fuel cell in which: a fuel cell stack with an end of cells in a stacking direction being supported by an end plate is installed in a vehicle so that the stacking direction extends along a right-left direction of the vehicle; and an off gas of an oxidant gas from the fuel cell stack is exhausted via a diluter from a rear side with respect to the fuel cell stack in a front-rear direction of the vehicle, wherein a junction between a plurality of exhaust manifolds for guiding the off gas of the oxidant gas discharged from the fuel cell stack is arranged on a front side in the end plate in the front-rear direction of the vehicle.

With such a configuration, since the junction between the plurality of exhaust manifolds for guiding the off gas of the oxidant gas from the fuel cell stack is arranged on the front side in the end plate in the front-rear direction of the vehicle, in the situation where the size of the diluter is increased in the front-rear direction of the vehicle to exhaust the off gas of the oxidant gas via this diluter at the rear side with respect to the fuel cell stack in the front-rear direction of the vehicle, it becomes possible to introduce the oxidant gas to a front part of the diluter. Accordingly, in comparison with the situation where the oxidant gas is introduced to the central part of the diluter, the oxidant gas can be allowed to flow more smoothly within the diluter to the exhaust port on the rear side, and therefore a pressure drop can be reduced.

In the vehicle-installation structure for the fuel cell, a pressure regulating valve may be directly connected to the junction.

With such a configuration, by directly connecting the pressure regulating valve to the junction of the exhaust manifolds, in comparison with the configuration where the pressure regulating valve is arranged in the middle of a connection pipe for connecting the junction of the exhaust manifolds and the diluter to each other, a space for arranging such a connection pipe can be eliminated or reduced and thus a wider space for arranging the diluter can be secured, and therefore the size of the diluter can be increased.

In the vehicle-installation structure for the fuel cell, a circulation pump for returning an off gas of a fuel gas from the fuel cell stack to the fuel cell stack may be arranged between the end plate and the diluter that is arranged apart from the end plate.

With such a configuration, as a result of the configuration in which, in order to suppress a pressure drop in the air exhaust manifolds for guiding the off gas of the oxidant gas, the exhaust manifolds are formed into a shape allowing for smooth gas distribution, even if the diluter is somewhat spaced apart from the end plate, it becomes possible to effectively utilize a clearance therebetween to arrange the circulation pump therein.

In the vehicle-installation structure for the fuel cell, a pump outlet of the circulation pump for returning the off gas of the fuel gas from the fuel cell stack to the fuel cell stuck and a fuel gas inlet in the end plate which introduces the off gas of the fuel cell may be arranged on opposite sides in the end plate in the front-rear direction of the vehicle, and a fuel gas intake from a fuel gas supply source may be provided on a side close to the pump outlet in a connection flow path connecting the pump outlet and the fuel gas inlet to each other.

With such a configuration, since the length of the connection path connecting the pump outlet and the fuel gas inlet can be increased and thus the distance between the fuel gas intake and the fuel gas inlet can be sufficiently secured, it becomes possible to promote mixture between the fuel gas from the fuel gas supply source and the off gas of the fuel gas from the fuel cell stack.

In the vehicle-installation structure for the fuel cell, the fuel gas inlet which introduces the off gas of the fuel gas may be arranged on a front part of the end plate in the front-rear direction of the vehicle.

With such a configuration, when the fuel gas supply source is arranged on the rear side in the front-rear direction of the vehicle, the structure capable of suppressing the pressure drop can be easily achieved while securing a sufficient length of the fuel path from the fuel gas supply tank.

In the vehicle-installation structure for the fuel cell, a fuel gas outlet which discharges the off gas of the fuel gas may be arranged on a rear part of the end plate in the front-rear direction of the vehicle.

With such a configuration, when the circulation pump for returning the off gas of the fuel gas to the fuel cell stack is arranged in the clearance on the rear side with respect to the junction in the front-rear direction of the vehicle, the clearance resulting from the configuration in which the junction between the exhaust manifolds for guiding the off gas of the oxidant gas from the fuel cell stack is arranged on the front side in the end plate in the front-rear direction of the vehicle, the fuel gas outlet can be arranged close to the circulation pump. Accordingly, the condensation of the off gas of the fuel gas can be suppressed.

In the vehicle-installation structure for the fuel cell, an exhaust valve for exhausting the off gas of the fuel gas from the fuel cell stack to the outside may be arranged in the diluter.

With such a configuration, the diluter can insulate the exhaust valve from heat or allow the exhaust valve to receive heat from the diluter, the freezing of the exhaust valve can be suppressed.

In the vehicle-installation structure for the fuel cell, an oxidant gas supply flow path for supplying the oxidant gas to the fuel cell stack may be directed frontward from the end plate in the front-rear direction of the vehicle.

With such a configuration, when an air compressor is arranged on the front side with respect to the fuel cell in the front-rear direction of the vehicle, the oxidant gas supply flow path for supplying the oxidant gas from the air compressor to the fuel cell stack can be minimized.

In the vehicle-installation structure for the fuel cell, an oxidant gas outlet for discharging the off gas of the oxidant gas may be provided on an upper part of the end plate.

With such a configuration, the water which enters from an exhaust system for the off gas of the oxidant gas when the vehicle is submerged in the water can be suppressed from flowing backward from the oxidant gas outlet into the fuel cell stack.

Effect of the Invention

The present invention can provide a vehicle-installation structure for a fuel cell with the capability of reducing a pressure drop in a gas flow path of the fuel cell.

BEST MODE FOR CARRYING OUT THE INVENTION

A vehicle-installation structure for a fuel cell according to an embodiment of the present invention will be described below with reference to the attached drawings.

Figure 1:
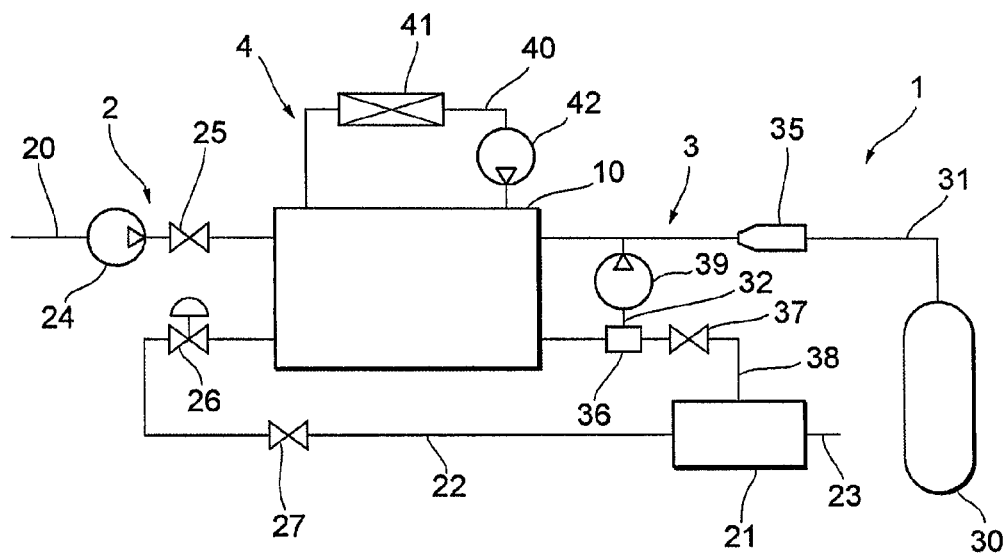
FIG. 1 is a configuration diagram showing a fuel cell system in a vehicle which employs a vehicle-installation structure for a fuel cell according to an embodiment of the present invention.

First, the configuration of a fuel cell system 1, which is a power generation system using a fuel cell 10, will be described with reference to FIG. 1.

The fuel cell system 1 includes the fuel cell 10 which is supplied with reactant gases (an oxidant gas and a fuel gas) and generates electric power, and further includes an oxidant gas pipe system 2 which supplies the air serving as the oxidant gas to the fuel cell 10, a hydrogen gas pipe system 3 which supplies hydrogen gas serving as the fuel gas to the fuel cell 10, a cooling system 4 that cools the fuel cell 10, etc.

The oxidant gas pipe system 2 includes an air supply flow path 20 which supplies the air humidified with a humidifier (not shown) to the fuel cell 10, an air discharge flow path 22 which guides the off gas of the air discharge from the fuel cell 10 to a diluter 21, and an exhaust flow path 23 which guides the off gas of the air from the diluter 21 to the outside of the vehicle. The air supply flow path 20 is provided with: an air compressor 24 which compresses and sends the air to the fuel cell 10; and an inlet valve 25 which opens and closes the air supply flow path 20. The air discharge flow path 22 is provided with: an air pressure regulating valve 26 that regulates the air pressure; and an outlet valve 27 that opens and closes the air discharge flow path 22.

The hydrogen gas pipe system 3 includes: a hydrogen supply flow path 31 for supplying a hydrogen gas from a hydrogen tank (a fuel gas supply source) 30, which is a fuel supply source storing a high-pressure hydrogen gas, to the fuel cell 10; and a circulation flow path 32 for returning the off gas of the hydrogen gas discharged from the fuel cell 10 to the hydrogen supply flow path 31.

The hydrogen supply flow path 31 is provided with an injector 35 on the upstream of the position where the hydrogen supply flow path 31 merges with the circulation flow path 32, the injector 35 controlling the supply of the hydrogen gas from the hydrogen tank 30. The injector 35 is a solenoid on-off valve which can regulate a gas flow rate and a gas pressure by directly driving a valve body so as to be away from a valve seat with an electromagnetic driving force with a certain driving period.

The circulation flow path 32 is connected to a discharge flow path 38 via a gas-liquid separator 36 and an exhaust/drain valve (an exhaust valve) 37. The gas-liquid separator 36 collects moisture from the off gas of the hydrogen gas. The exhaust/drain valve 37 purges the moisture collected by the gas-liquid separator 36 and the off gas of the hydrogen gas containing impurities in the circulation flow path 32 to the outside.

The circulation flow path 32 is also provided with a hydrogen pump (a circulation pump) 39 that compresses the off gas of the hydrogen gas in the circulation flow path 32, which has been discharged from the fuel cell 10, and sends the compressed off gas toward the hydrogen supply flow path 31 so as to be returned to the fuel cell 10. Note that the off gas of the hydrogen gas which is discharged via the exhaust/drain valve 37 and the discharge flow path 38 is configured to be merged with the off gas of the air in the air discharge flow path 22 and diluted by the diluter 21.

During normal operation of the above-described fuel cell system 1, the hydrogen gas is supplied from the hydrogen tank 30 to a fuel electrode of the fuel cell 10 via the hydrogen supply flow path 31 under the control of the injector 35, while the air is supplied via the air supply flow path 20 to an oxygen electrode of the fuel cell 10 by driving the air compressor 24, thereby generating electric power.

The off gas of the hydrogen gas discharged from the fuel cell 10 is subjected to the removal of moisture by the gas-liquid separator 36 and then introduced into the hydrogen supply flow path 31, by driving the hydrogen pump 39, properly mixed with the hydrogen gas from the hydrogen tank 30, and then supplied to the fuel cell 10 again.

When the exhaust/drain valve 37 is opened in accordance with the appropriate timing, the moisture collected by the gas-liquid separator 36 and the off gas of the hydrogen gas which contains impurities in the circulation flow path 32 are introduced into the diluter 21. Then the diluter 21 dilutes the moisture and the off gas of the hydrogen gas by mixing them with the off gas of the air discharged from the fuel cell 10 via the air discharge flow path 22, and then exhausts the resulting gas to the outside of the vehicle via the exhaust flow path 23.

The cooling system 4 has a cooling flow path 40 that circulates cooling water so as to be provided to the fuel cell 10. The cooling flow path 40 is provided with: a radiator 41 which releases heat in the cooling water to the outside; and a cooling water pump 42 which compresses and circulates the cooling water.

Figure 2:
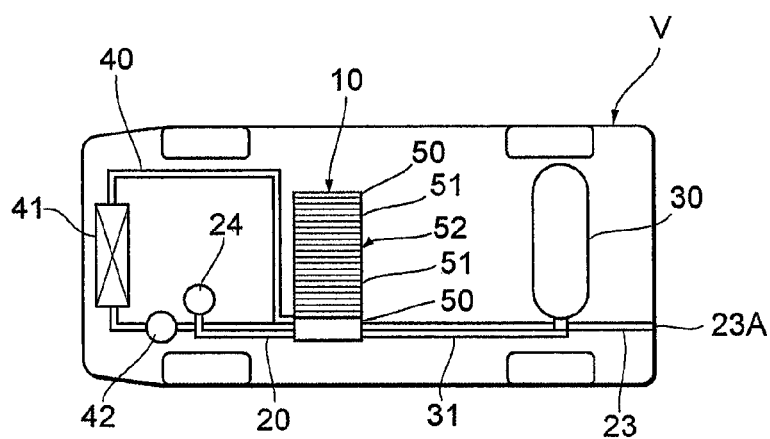
FIG. 2 is a plan view showing the vehicle-installation structure for the fuel cell according to the embodiment of the present invention.

As shown in FIG. 2, the fuel cell 10 has a fuel cell stack 52 in which a desired number of cells 51 are stacked and ends in the stacking direction are supported by end plates 50 of a common type, the cells 51 generating electric power with the supply of reactant gases. The fuel cell 10 is installed in the vehicle V so that the fuel cell stack 52 is arranged with the stacking direction of the cells 51 extending along a right-left direction of the vehicle. The end plate 50 has a rectangular shape whose long side extends along a front-rear direction of the vehicle.

The location where the fuel cell 10 is arranged is under the floor of the position of a front seat (not shown), and the fuel cell 10 may be arranged under the floor of a rear seat. The hydrogen tank 30 installed in a rear part of the vehicle V, which is on the rear side of the fuel cell 10 in the front-rear direction of the vehicle. The exhaust flow path 23 extends toward the rear side with respect to the fuel cell 10 in the front-rear direction of the vehicle, and an exhaust port 23A, which is an exit to the outside of the vehicle, opens on the rear side with respect to the fuel cell 10 in the front-rear direction of the vehicle.

Figure 3:
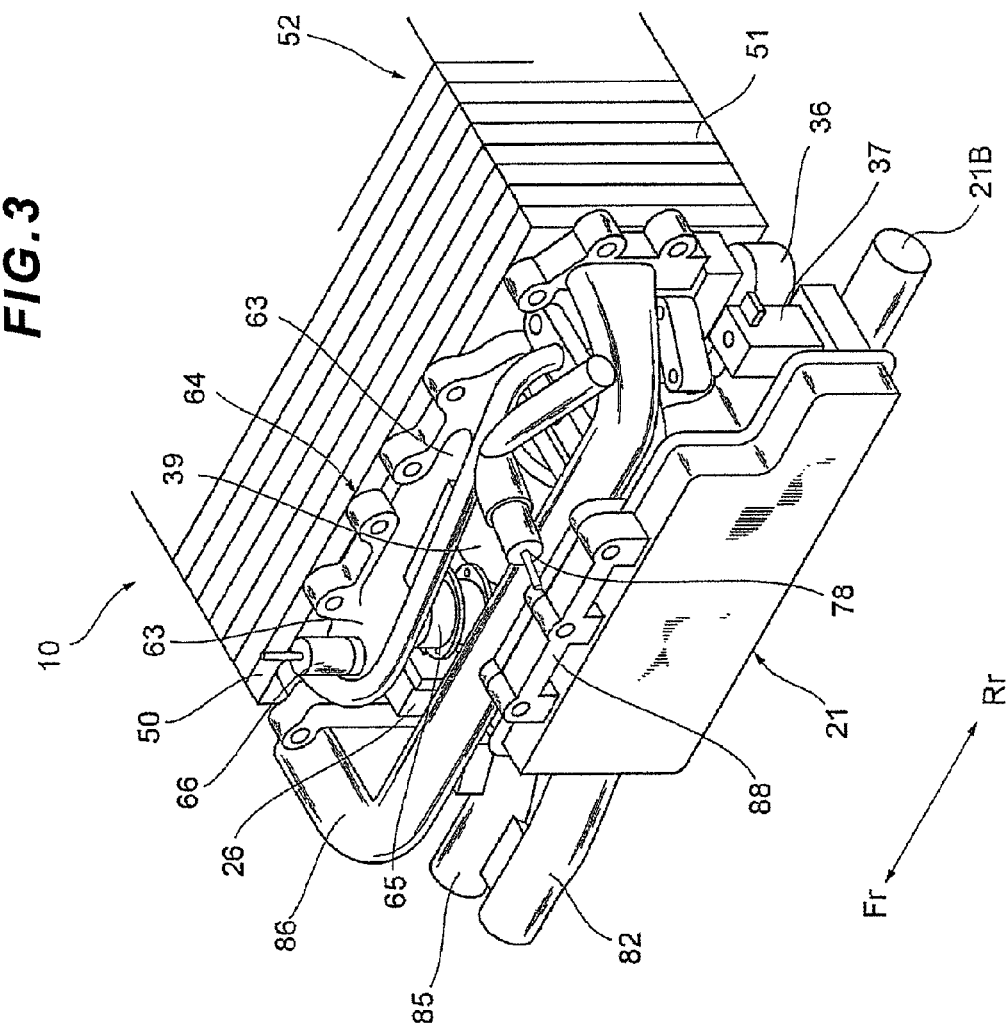
FIG. 3 is a perspective view showing a primary part of the vehicle-installation structure for the fuel cell according to the embodiment of the present invention.

Auxiliary apparatuses of the fuel cell 10 are attached to the end plate 50 of the fuel cell 10 as shown in FIG. 3, since such a configuration has merits such as, for example, it becoming unnecessary to provide and install an additional reinforcing member, the weight of the fuel cell 10 being able to be utilized to absorb vibration, and it becoming unnecessary to provide an absorber for assembly errors.

Figure 4:
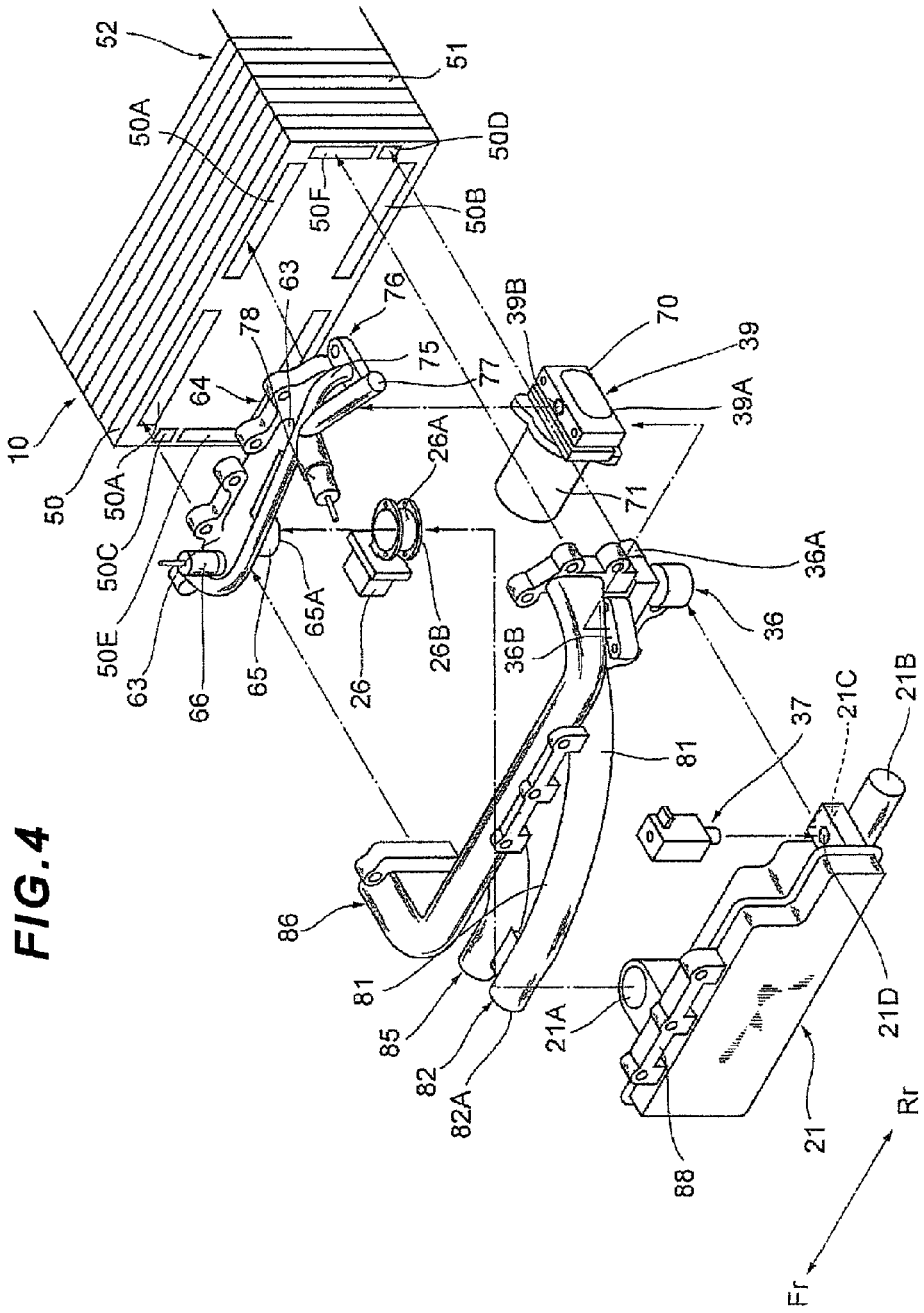
FIG. 4 is an exploded perspective view showing a primary part of the vehicle-installation structure for the fuel cell according to the embodiment of the present invention.

As shown in FIG. 4, air outlets (oxidant gas outlets) 50A for discharging off gas of the air from the fuel cell stack 52 are provided in an upper end of the end plate 50, at plural positions, specifically two positions, in the front and rear sides in the front-rear direction of the vehicle. Also, air inlets (oxidant gas inlets) 50B for introducing the air to the fuel cell stack 52 are provided in a lower end of the end plate 50, at plural positions, specifically two positions, in the front and rear sides in the front-rear direction of the vehicle.

An upper part in a front end of the end plate 50 in the front-rear direction of the vehicle is provided with a hydrogen gas inlet (fuel gas inlet) 50C for introducing the hydrogen gas and the off gas of the hydrogen gas. Also, a lower part in a rear end of the end plate 50 in the front-rear direction of the vehicle is provided with a hydrogen gas outlet (fuel gas outlet) 50D for discharging the off gas of the hydrogen gas.

A cooling water inlet 50E for introducing the cooling water is formed below the hydrogen gas inlet 50C in the front end of the end plate 50 in the front-rear direction of the vehicle, and a cooling water outlet 50F for discharging the cooling water is formed above the hydrogen gas outlet 50D in the rear end of the end plate 50 in the front-rear direction of the vehicle.

Figure 5:
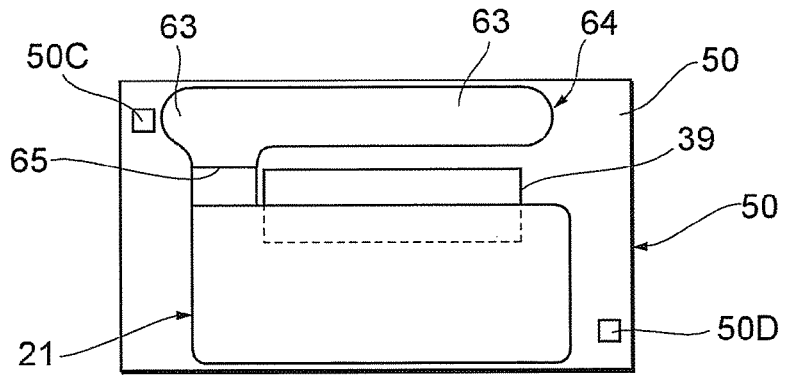
FIG. 5 is a front view showing a primary part of the vehicle-installation structure for the fuel cell according to the embodiment of the present invention.

Attached to the upper part of the end plate 50 is a single air exhaust manifold member 64 having: an air exhaust manifold 63 that guides the off gas of the air from the air outlet 50A on the front side in the front-rear direction of the vehicle; and an air exhaust manifold 63 that guides the off gas of the air from the air outlet 50A on the rear side in the front-rear direction of the vehicle. The air exhaust manifold member 64 is arranged within the area of the end plate 50 in the front-rear direction of the vehicle as shown in FIG. 5.

The air exhaust manifold 63 and the air exhaust manifold 63 merge with each other at plural positions, specifically at two positions, inside the air exhaust manifold member 64, and a junction 65 where they are merged with each other projects downward in the vertical direction from a front part of the air exhaust manifold member 64 in the front-rear direction of the vehicle, the junction 65 being arranged on the front side with respect to the center of the end plate 50 in the front-rear direction of the vehicle. A pressure sensor 66 shown in FIG. 4 is attached to the junction 65 so as to project frontward in the front-rear direction of the vehicle.

The junction 65 opens downward in the vertical direction, and a lower opening 65A of the junction 65 is directly connected to an upper opening 26A of the above-described air pressure regulating valve 26. The air pressure regulating valve 26 is configured so that: a lower opening 26B thereof opens downward in the vertical direction, and an inner flow path thereof extends along the vertical direction. Note that the air exhaust manifold member 64 constitutes a part of the above-described air discharge flow path 22.

Figure 6:
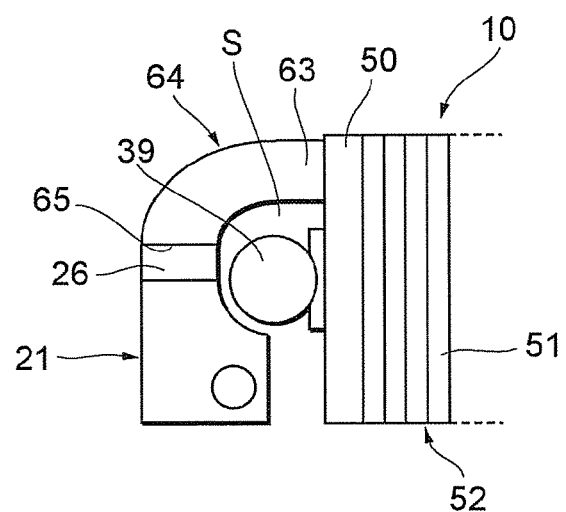
FIG. 6 is a side view showing a primary part of the vehicle-installation structure for the fuel cell according to the embodiment of the present invention.

The above-described diluter 21 has a connection port 21A which opens upward, the connection port 21A provided at a front part of the diluter 21 in the front-rear direction of the vehicle and on the side closer to the end plate 50. The connection port 21A is connected to the lower opening 26B of the air pressure regulating valve 26 described above. As shown in FIG. 6, the air exhaust manifold member 64 has the air exhaust manifold 63 and the air exhaust manifold 63 gently curved toward the junction 65 opening downward, in order to reduce a pressure drop caused by the shapes of the air exhaust manifolds 63. As a result, a clearance S is provided between the end plate 50 and the junction 65 of the air exhaust manifold member 64, the air pressure regulating valve 26 and the diluter 21.

As shown in FIG. 4, the diluter 21 is provided with an exhaust port 21B extending rearward from a rear end of the diluter 21 in the front-rear direction of the vehicle, the exhaust port 21B being connected to the above-described exhaust flow path 23.

Figure 7:
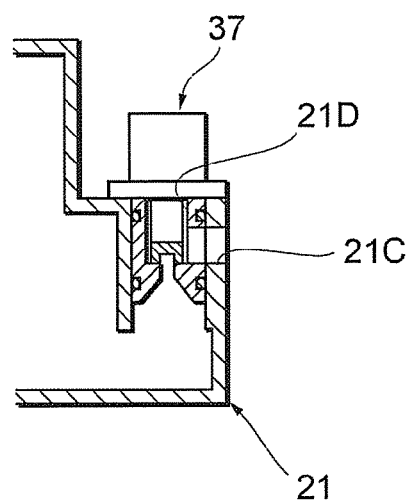
FIG. 7 is a side sectional view showing a diluter and an exhaust/drain valve in the vehicle-installation structure for the fuel cell according to the above embodiment.

The diluter 21 has a connection port 21C which opens toward the end plate 50, the connection port 21C provided on a rear part of the diluter 21 in the front-rear direction of the vehicle and on the side closer to the end plate 50, and an attachment port 21D opening upward is formed above the connection port 21C as shown in FIG. 7, the attachment port 21D being used for attaching the exhaust/drain valve 37 thereto. In other words, the exhaust/drain valve 37 is arranged on the diluter 21.

The above-described clearance S is formed between the diluter 21 and the end plate 50, and the gas-liquid separator 36 connecting the connection port 21C of the diluter 21 and the hydrogen gas outlet 50D of the end plate 50 to each other is mounted in the clearance S. The gas-liquid separator 36 is provided with: a connection port 36A arranged on the side closer to the end plate 50 and connected to the hydrogen gas outlet 50D; and a connection port 36B which opens upward and is provided above the connection port 36A.

The exhaust/drain valve 37 attached to the attachment port 21D of the diluter 21 opens and closes the connection port 21C of the diluter 21. When the exhaust/drain valve 37 opens the connection port 21C, the off gas of the hydrogen gas from the hydrogen gas outlet 50D is introduced into the diluter 21 together with the water stored in the gas-liquid separator 36; whereas, when the exhaust/drain valve 37 closes the connection port 21C, the off gas of the hydrogen gas which is discharged from the hydrogen gas outlet 50D and subjected to the removal of the moisture by the gas-liquid separator 36 is discharged from the connection port 36B located on the upper part of the gas-liquid separator 36.

The connection port 36B on the upper part of the gas-liquid separator 36 is connected to the above-described hydrogen pump 39. The hydrogen pump 39 has: a pumping unit 70 in which a lower pump inlet 39A is connected to the connection port 36B on the upper part of the gas-liquid separator 36 to suck the off gas of the hydrogen gas from the connection port 36B and the gas is discharged from an upper pump outlet 39B; and a driving unit 71 which drives the pumping unit 70. The hydrogen pump 39 is also arranged in the above-described clearance S formed between the diluter 21 and the end plate 50, and fixed to the end plate 50.

In other words, the hydrogen pump 39 is arranged with its longitudinal direction extended along the front-rear direction of the vehicle and with the pumping unit 70 positioned on the rear side in the front-rear direction of the vehicle, the hydrogen pump 39 being arranged in the clearance S at a position below the air exhaust manifold member 64 and on the rear side with respect to the junction 65 in the front-rear direction of the vehicle. As a result, the hydrogen pump 39 is arranged at a height equal to that of the air pressure regulating valve 26 and on the rear side of the air pressure regulating valve 26 in the front-rear direction of the vehicle.

The pump outlet 39B of the hydrogen pump 39 arranged on the rear side of the end plate 50 in the front-rear direction of the vehicle is provided with a hydrogen intake manifold member 76 having a connection flow path 75 for connecting the pump outlet 39B to the hydrogen gas inlet 50C arranged on the front end of the end plate 50, which is the opposite side of the pump outlet 39B in the front-rear direction of the vehicle.

The hydrogen intake manifold member 76 has: the above-described connection flow path 75 which is arranged on the air exhaust manifold member 64 on the opposite side of the end plate 50 and which extends in the front-rear direction of the vehicle, the connection flow path 75 connecting the pump outlet 39B of the hydrogen pump 39 and the hydrogen gas inlet 50C of the end plate 50 to each other; and a hydrogen gas intake (fuel gas intake) 77 which merges with the connection flow path 75 on the side close to the pump outlet 39B. The connection flow path 75 extends between the pressure sensor 66 of the air exhaust manifold member 64 and the air pressure regulating valve 26 and is connected to the hydrogen gas inlet 50C.

The hydrogen gas intake 77 is arranged on the opposite side of the end plate 50 in the connection flow path 75 and extends rearward in the front-rear direction of the vehicle, the hydrogen gas intake 77 introducing the fuel gas from the hydrogen tank 30 on the rear part of the vehicle into the connection flow path 75. The position where the hydrogen gas intake 77 merges with the connection flow path 75 is provided with a pressure sensor 78 so as to project toward a side other than the end plate 50. Note that the part closer to the hydrogen gas inlet 50C with respect to the merging position in the connection flow path 75, as well as the hydrogen gas intake 77, constitute a part of the above-described hydrogen supply flow path 31 and the part closer to the hydrogen pump 39 with respect to the merging position in the connection flow path 75 constitutes a part of the above-described circulation flow path 32.

The air compressor 24 described above is arranged outside a vehicle compartment and on the front side with respect to the fuel cell 10 in the front-rear direction of the vehicle as shown in FIG. 2, in order to reduce noise and vibration in the vehicle compartment. As shown in FIG. 4, attached to the air inlets 50B formed on the front and rear sides in the front-rear direction of the vehicle in the lower part of the end plate 50 is an air intake manifold member 82 having: an air intake manifold (an oxidant gas supply flow path) 81 which guides the air from the air compressor 24 to the front air inlet 50B in the front-rear direction of the vehicle; and an air intake manifold 81 which guides the air to the rear air inlet 50B in the front-rear direction of the vehicle.

The air intake manifold member 82 constitutes a part of the air supply flow path 20 from the air compressor 24, the air intake manifold member 82 as a whole extending frontward from the end plate 50 in the front-rear direction of the vehicle, and a single intake 82A provided at an extended end is connected to the air compressor 24. The intake 82A is internally branched into the two air intake manifolds 81 described above. The air intake manifold member 82 is arranged below the hydrogen pump 39 and the air pressure regulating valve 26 in the above-described clearance S between the end plate 50 and the diluter 21.

The radiator 41 described above is arranged on a front part of the vehicle in order to improve cooling efficiency, and the cooling water pump 42 is also arranged outside the vehicle compartment on the front side with respect to the fuel cell 10 in the front-rear direction of the vehicle in order to reduce the noise and vibration in the vehicle compartment. A cooling water intake pipe 85 constituting a part of the cooling flow path 40 from the cooling water pump 42 is attached to the cooling water inlet 50E formed on the front part of the end plate 50 in the front-rear direction of the vehicle.

The cooling water intake pipe 85 extends and is directed frontward from the end plate 50 in the front-rear direction of the vehicle, and is arranged between the end plate 50 and the air intake manifold member 82 and at a position below the hydrogen pump 39 and the air pressure regulating valve 26.

A cooling water discharge pipe 86 constituting a part of the cooling flow path 40 extending to the radiator 41 is attached to the cooling water outlet 50F formed on the rear part of the end plate 50 in the front-rear direction of the vehicle. The cooling water discharge pipe 86 extends frontward from the end plate 50 in the front-rear direction of the vehicle, and a front end thereof is bent along the front side of the fuel cell 10.

The cooling water discharge pipe 86 is arranged: between the hydrogen pump 39/the air pressure regulating valve 26 and the upper part of the diluter 21; and at a position above the cooling water intake pipe 85 and the air intake manifold member 82. Note that a joint 88 on the upper part of the diluter 21 is attached to the cooling water discharge pipe 86 on a side other than the end plate 50.

In the above-described vehicle-installation structure for the fuel cell according to this embodiment, since the junction 65 between the two air exhaust manifolds 63 for guiding the off gas of the air from the fuel cell stack 52 is arranged on the front side in the end plate 50 in the front-rear direction of the vehicle, in the situation where the size of the diluter 21 is increased in the front-rear direction of the vehicle to exhaust the off gas of the air via this diluter 21 at the rear side with respect to the fuel cell stack 52 in the front-rear direction of the vehicle, it becomes possible to introduce the air to the front part of the diluter 21.

Accordingly, since substantially linear flow paths can be provided instead of folded flow paths provided in the configuration where the air is introduced to the central part of the diluter 21, the air can be allowed to flow more smoothly within the diluter 21 to the exhaust port 23A on the rear side, in comparison with the case where the air is introduced to the central part of the diluter 21, and therefore a pressure drop can be reduced.

Also, since the air pressure regulating valve 26 is directly connected to the junction 65 of the two air exhaust manifolds 63 of the air exhaust manifold member 64, in comparison with the configuration where the air pressure regulating valve 26 is arranged in the middle of a connection pipe for connecting the junction 65 of the air exhaust manifolds 63 and the diluter 21 to each other, a space for arranging such a connection pipe can be eliminated or reduced and thus a wider space for arranging the diluter 21 can be secured, and therefore the size of the diluter 21 can be increased. In addition, since the internal path of the air pressure regulating valve 26 is arranged along the vertical direction (the upper-lower direction), hardly any water pools therein.

As a result of the configuration in which, in order to suppress a pressure drop in the air exhaust manifolds 63 for guiding the off gas of the air, the internal air exhaust manifolds 63 are formed into a shape allowing for the smooth gas distribution and the distance to the junction 65 is sufficiently secured as described above, even if the diluter 21 is somewhat spaced apart from the end plate 50, it becomes possible to effectively utilize the clearance S therebetween to arrange the hydrogen pump 39, etc.

Also, since the hydrogen pump 39 which is heavy and vibrates is fixed to the end plate 50, a rigidity in attachment can be easily ensured, and excellent anti-vibration performance can be obtained.

Since the pump outlet 39B of the hydrogen pump 39 and the hydrogen gas inlet 50C of the end plate 50 are arranged on the sides opposite to each other in the end plate 50 in the front-rear direction of the vehicle, and the hydrogen gas intake 77 is provided on the side of the pump outlet 39B, the length of the flow path connecting the pump outlet 39B and the hydrogen gas inlet 50C can be increased and thus the distance between the hydrogen gas intake 77 and the hydrogen gas inlet 50C can be sufficiently secured. Accordingly, it becomes possible to promote mixture between the hydrogen gas from the hydrogen tank 30 and the off gas of the hydrogen gas from the fuel cell stack 52.

Since the hydrogen gas inlet 50C for introducing the off gas of the hydrogen gas is arranged on the front part of the end plate 50 in the front-rear direction of the vehicle, the structure capable of suppressing the pressure drop can be easily achieved while securing a sufficient length of the fuel path from the hydrogen tank 30 arranged on the rear side with respect to the fuel cell 10 in the front-rear direction of the vehicle.

Since the hydrogen gas outlet 50D for discharging the off gas of the hydrogen gas is arranged on the front part of the end plate 50 in the front-rear direction of the vehicle, when the hydrogen pump 39 is arranged in the clearance S on the rear side with respect to the junction 65 in the front-rear direction of the vehicle, which results from the configuration in which the junction 65 between the two air exhaust manifolds 63 is arranged on the front side in the end plate 50 in the front-rear direction of the vehicle as described above, the hydrogen gas outlet 50D can be arranged close to the hydrogen pump 39.

Accordingly, it becomes possible to suppress condensation of the off gas of the hydrogen gas, and the amount of water to be returned to the fuel cell 10 can be reduced and the voltage can be stabilized.

Also, since the exhaust/drain, valve 37 is arranged in the diluter 21, the diluter 21 can insulate the exhaust/drain valve 37 from heat or allow the exhaust/drain valve 37 to receive heat from the diluter 21, and therefore the freezing of the exhaust/drain valve 37 can be suppressed.

In addition, by connecting the hydrogen gas outlet 50D, the gas-liquid separator 36 and the diluter 21 to each other and inserting the exhaust/drain valve 37 in the diluter 21, a flow path extending from the hydrogen gas outlet 50D to the diluter 21 via the gas-liquid separator 36 and the exhaust/drain valve 37 can be formed, and thus the exhaust/drain valve 37 can be attached more easily in comparison with the configuration where the gas-liquid separator 36, the exhaust/drain valve 37 and the diluter 21 are connected in series. As a result, an attachment space of an attachment tool can be reduced, and the influence of the attachment space, etc. on the capacity of the diluter can be suppressed.

Since the air intake manifold 81 for supplying the air to the fuel cell stack 52 is provided so as to be directed frontward from the end plate 50 in the front-rear direction of the vehicle, the flow path for supplying the air to the fuel cell stack 52 from the air compressor 24 arranged on the front side relative to the fuel cell 10 can be minimized, and response performance can be improved. In addition, the capacity of the diluter can be maximized.

Since the air outlet 50A for discharging the off gas of the air is provided in the upper part of the end plate 50, the water which enters from an exhaust system for the off gas of the air when the vehicle is submerged in the water can be suppressed from flowing backward from the air outlet 50A into the fuel cell stack 52.

DESCRIPTION OF REFERENCE NUMERALS

10: fuel cell, 21: diluter, 26: air pressure regulating valve (pressure regulating valve), 30: hydrogen tank (fuel gas supply source), 37: exhaust/drain valve (exhaust valve), 39: hydrogen pump (circulation pump), 39B: pump outlet, 50: end plate, 50A: air outlet (oxidant gas outlet), 50C: hydrogen gas inlet (fuel gas inlet), 50D: hydrogen gas outlet (fuel gas outlet), 51: cell, 52: fuel cell stack, 63: air exhaust manifold (exhaust manifold), 65: junction, 75: connection flow path, 77: hydrogen gas intake (fuel gas intake), 81: air intake manifold (oxidant gas supply flow path), S: clearance, V: vehicle.

What is claimed is:
1. A vehicle-installation structure for a fuel cell in which: a fuel cell stack with an end of cells in a stacking direction being supported by an end plate is installed in a vehicle so that the stacking direction extends along a right-left direction of the vehicle; and an off gas of an oxidant gas from the fuel cell stack is exhausted via a diluter from a rear side with respect to the fuel cell stack in a front-rear direction of the vehicle,
wherein a plurality of exhaust manifolds for guiding the off gas of the oxidant gas discharged from the fuel cell stack is attached to an upper part of the end plate, and a junction between these exhaust manifolds and a connection port between the diluter and the junction are arranged on a front side of the end plate, wherein the end plate extends in the front-rear direction of the vehicle;
wherein the diluter is arranged so as to extend below the exhaust manifolds in the front-rear direction of the vehicle; and wherein a circulation pump for returning an off gas of a fuel gas from the fuel cell stack to the fuel cell stack is arranged between the end plate and the diluter that is arranged apart from the end plate.

2. The vehicle-installation structure for the fuel cell according to claim 1, wherein a pressure regulating valve is directly connected to the junction.

3. The vehicle-installation structure for the fuel cell according to claim 1, wherein: a pump outlet of the circulation pump for returning the off gas of the fuel gas from the fuel cell stack to the fuel cell stack and a fuel gas inlet in the end plate which introduces the off gas of the fuel cell are arranged on opposite sides in the end plate in the front-rear direction of the vehicle; and a fuel gas intake from a fuel gas supply source is provided on a side close to the pump outlet in a connection flow path connecting the pump outlet and the fuel gas inlet to each other.

4. The vehicle-installation structure for the fuel cell according to claim 3, wherein the fuel gas inlet which introduces the off gas of the fuel gas is arranged on a front part of the end plate in the front-rear direction of the vehicle.

5. The vehicle-installation structure for the fuel cell according to claim 3, wherein a fuel gas outlet which discharges the off gas of the fuel gas is arranged on a rear part of the end plate in the front-rear direction of the vehicle.

6. The vehicle-installation structure for the fuel cell according to claim 1, wherein a fuel gas inlet which introduces the off gas of the fuel gas is arranged on a front part of the end plate in the front-rear direction of the vehicle.

7. The vehicle-installation structure for the fuel cell according to claim 1, wherein a fuel gas outlet which discharges the off gas of the fuel gas is arranged on a rear part of the end plate in the front-rear direction of the vehicle.

8. The vehicle-installation structure for the fuel cell according to claim 1, wherein an exhaust valve for exhausting the off gas of the fuel gas from the fuel cell stack to the outside is arranged in the diluter.

9. The vehicle-installation structure for the fuel cell according to claim 1, wherein an oxidant gas supply flow path for supplying the oxidant gas to the fuel cell stack is directed frontward from the end plate in the front-rear direction of the vehicle.

10. The vehicle-installation structure for the fuel cell according to claim 1, wherein an oxidant gas outlet for discharging the off gas of the oxidant gas is provided on an upper part of the end plate.

11. A vehicle-installation structure for a fuel cell in which: a fuel cell stack with an end of cells in a stacking direction being supported by an end plate is installed in a vehicle so that the stacking direction extends along a right-left direction of the vehicle; and an off gas of an oxidant gas from the fuel cell stack is exhausted via a diluter from a rear side with respect to the fuel cell stack in a front-rear direction of the vehicle;

wherein a plurality of exhaust manifolds for guiding the off gas of the oxidant gas discharged from the fuel cell stack is attached to an upper part of the end plate;

wherein a junction between the plurality of exhaust manifolds and a connection port between the diluter and the junction are arranged on a front side of the end plate, wherein the end plate extends in the front-rear direction of the vehicle; and wherein the diluter is arranged so as to extend below the exhaust manifolds in the front-rear direction of the vehicle.

* * * * *